United States Patent

[11] 3,628,992

[72] Inventors William J. McKillip
  Minneapolis;
  Clarence N. Impola, Prior Lake, both of Minn.
[21] Appl. No. 881,879
[22] Filed Dec. 3, 1969
[45] Patented Dec. 21, 1971
[73] Assignee Ashland Oil, Inc.
  Houston, Tex.

[54] BONDING OF RUBBER TO FIBROUS REINFORCERS
  12 Claims, No Drawings

[52] U.S. Cl.................................................... 117/76 A,
  117/122 P, 117/122 PF, 117/122 PA, 117/126 GE,
  117/123 D, 117/128.4, 117/132 B, 117/132 BE,
  117/138.8 F, 117/145, 117/161 A, 117/161 P,
  117/161 ZA, 161/184, 161/185, 260/47 EN
[51] Int. Cl......................................................... C09j 7/02
[50] Field of Search............................................ 117/122 P,
  122 PF, 122 PA, 161 P, 161 ZB, 161 A, 76 T, 126
  GE, 145, 138.8 F, 132, 128.4, 123; 161/184, 185;
  260/47 EN

[56] References Cited
UNITED STATES PATENTS

| | | | |
|---|---|---|---|
| 3,450,673 | 6/1969 | McKillip et al. ............... | 260/561 X |
| 3,460,973 | 8/1969 | Hantzer et al. ................ | 117/76 |
| 3,485,806 | 12/1969 | Bloomquist et al. .......... | 117/148 X |
| 3,502,603 | 3/1970 | Gallagher et al.............. | 117/76 X |

Primary Examiner—William D. Martin
Assistant Examiner—Bernard D. Pianalto
Attorneys—William Kammerer, Larry W. Evans and Walter H. Schneider ABSTRACT: Aromatic and aliphatic polyaminimides are disclosed as constituting a class of polyisocyanate precursors which can be effectively utilized in isocyanate-based adhesive systems for bonding rubber to fibrous polyester and like substrates.

BONDING OF RUBBER TO FIBROUS REINFORCERS

BACKGROUND OF THE INVENTION

1. Field of the Invention

This invention relates to the treatment of a filamentary substrate to improve the bonding properties thereof when utilized as the reinforcing element in the fabrication of vulcanized rubber structures.

2. Description of the Prior Art

In the manufacture of a variety of vulcanized rubber goods reinforced with a fibrous textile material, particularly exemplary of which are pneumatic tires and power transmission belts, the serviceability of the resultant structures largely depends upon the strength of the adhesive bond formed between the reinforcing element and the rubber in the course of the vulcanization step. The problem of adhesion is especially in the forefront in the manufacture of motor vehicle tires since the severe service conditions to which these structures are subjected nowadays can result in the development of extremely high temperatures and enormous dynamic stresses therein which in turn are prone to cause separation of delamination of the reinforcing element from the rubber.

In the initial phase of the tire industry, woven cotton fabrics were customarily employed as the reinforcing element. Mechanical keying around the protruding ends of the cotton staple and rubber strikethrough of the fabric that occurred upon vulcanization provided sufficient bonding, thereby obviating the need of an adhesive. The subsequent use of rayon and the contemporary development of the bias ply tire, however, necessitated the use of a precoat of natural or SBR rubber latex adhesive to achieve a requisite degree of tie bonding. Later, with the introduction of nylon as a reinforcer, it was found that the bonding properties of the natural or SBR rubber latices were not suitable for this purpose. This in turn led to the development of special elastomer latices, e.g., a butadiene/stryrene/vinyl pyridine terpolymer and the use thereof in combination with a phenol-formaldehyde condensate as the adhesive composition. Once the art settled on the preferred use of resorcinol for preparing the latter, this adhesive system became known as RFL.

With the advent of the polyester fiber era, the tire industry was soon to recognize the potential of this material as a rubber reinforcer. When tested as such for tires, it is found that polyester provided a product having exceptional performance characteristics in terms of strength, durability and tread wear. Notwithstanding the overall excellent properties of the polyester, the general use thereof in tire construction was delayed for lack of effective adhesive since the RFL system proved to be unsatisfactory for bonding rubber thereto.

The breakthrough in the development of an effectual adhesive composition for polyester came with the discovery of the polyisocyanate-based system. Although many variations of the latter system have been proposed, the one that has gained the most widespread acceptance is the two-dip method wherein the polyester is first treated with an aqueous dispersion of a polyepoxide and an aromatic polyisocyanate blocked with phenol, followed by treatment with a conventional RFL adhesive.

One of the principal disadvantages of the aforementioned two-dip method stems from the fact that the blocked isocyanates are very difficult to disperse in water and consequently, an extensive ball milling procedure is required to obtain even at best a tolerably stable mechanical dispersion of this component. Accordingly, uniform coating of the polyester cord with such dispersions is tedious to maintain on the production line. An additional problem accompanying the use of the blocked isocyanate is that phenol is given off in the course of resolving the complex. Phenol, besides being toxic, also adversely affects the strength properties of polyester fiber.

SUMMARY OF THE INVENTION

In accordance with the present invention, a novel adhesive coating composition for bonding rubber to a filamentary substrate of glass or a synthetic polymer is provided which comprises the heat reaction product of a polyepoxide and a latent polyisocyanate in the form of a compound having a plurality of tertiary aminimide radicals. Such coatings are obtained by applying to the substrate an aqueous dispersion of a polyepoxide containing a polyaminimide dissolved or dispersed therein and thereupon heating to effect concomitant drying and rearrangement of the polyaminimide to yield the corresponding polyisocyanate for reaction with the polyepoxide component.

The foremost advantageous feature of the polyaminimides of this invention in attaining the objectives thereof is that most of such compounds are completely water soluble. In these few instances where not completely water soluble, the compounds are nonetheless highly hydrophilic and therefore can be readily dispersed or emulsified in an aqueous medium. Consequently, in the application of the aqueous emulsion of the polyaminimide-polyepoxide combination, excellent wetout of the substrate readily occurs and thus no problem is encountered in consistently obtaining coatings of uniform composition.

The polyaminimides useful herein can be rearranged to the corresponding polyisocyanate at temperatures ordinarily observed in unblocking the complexed isocyanates of the prior art. Such rearrangement, however, results in a tertiary amine leaving group having essentially no deleterious effect on polyester. Accordingly, the toxicity and degradation problems attendant in the use of the conventional phenol-blocked isocyanates are obviated in the practice of this invention.

Still another potential advantage of the present invention is attributed to certain inherent characteristics of the polyminimide as isocyanate precursors. Since the thermolytic conversion of the polyaminimide is a time-temperature dependent chemical reaction, the rate of the resultant rearrangement can be readily controlled decidedly better control than the rate experienced in resolving an isocyanate-phenol complex. Consequently, the rearrangement characteristics of a polyaminimide can be expected to provide a polyurethane complex with the polyepoxide having free aminimide radicals capable of further reacting with the RFL coating or for that matter with any free active hydrogen groups of the subsequently applied rubber as well as such groups contained by compounds that might be incorporated therein.

DESCRIPTION OF THE PREFERRED EMBODIMENTS

While the reaction product resulting in the practice of this invention in itself serves as an adhesive for bonding a vulcanizable rubber to the substrate, the preferred embodiments of the invention contemplate that the substrate also bears a coating of conventional RFL adhesive. The latter can be applied after or before treating the substrate with polyepoxide-polyaminimide reaction product. Further details concerning the applicable RFL adhesive coating compositions will be set forth hereinbelow.

The polyaminimides from which the novel adhesive coatings of this invention can be obtained have the following general formula:

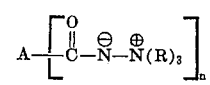

wherein A represents an aromatic, aliphatic or cycloaliphatic residue, R is alkyl or hydroxyalkyl and $n$ is 2, 3 or 4.

Illustrative of the mechanism whereby the aminimide radical rearranges to an isocyanate group is shown in the following schematic.

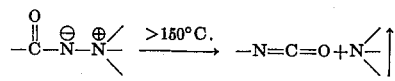

An extensive, although not exclusive enumeration of polyaminimides useful in accordance with this invention together with a description and exemplification of a method for the preparation thereof are set forth in U.S. Pat. No. 3,450,673. Briefly, such method consists of reacting a polycarboxylic acid chloride with a unsymmetrical disubstituted hydrazine followed by quaternizing the resultant acid hydrazide and finally treating with a strong base to yield the aminimide. In light of the fact that the polyaminimide is to be converted to the corresponding polyisocyanate in carrying out the present invention, it is desirable to generate a leaving group as volatile as possible. Accordingly, it is preferred to employ a hydrazine appropriately substituted with lower alkyl groups in the preparation thereof. Likewise, the use of a low molecular weight quaternizing agent, as for example, the $C_1-C_4$ alkyl chlorides, is indicated.

An alternate and more efficient manner for preparing the polyaminimides structurally noted above is described in U.S. Ser. No. 703,554, filed Feb. 7, 1968, now U.S. Pat. No. 3,485,806. This method consists of reacting a carboxylic acid ester, preferably those esters wherein the ester group is a lower alkyl, with an equivalent of each of an unsymmetrical di-(lower)alkyl hydrazine and a lower alkylene oxide. A further preparatory route involving the use of a polycarboxylic ester consists of reacting the ester preferably in an aprotic solvent, with about a stoichiometric amount of tri-(lower)alkyl hydrazinium halide in the presence of approximately an equivalent proportion of a strong base. The latter method is described in detail in application Ser. No. 514,705, filed Dec. 17, 1965 and now abandoned.

A variety of polyepoxides are applicable for coreacting with the polyisocyanates in accordance with this invention. A preferred class of epoxides are the dehydrohalogenation condensation products of a polyol and at least two equivalent portions of epichlorohydrin. A particularly preferred polyol for this purpose is glycerine as the resultant epoxide products are easily handled liquid materials having a high oxirane oxygen content, e.g., epoxide equivalents ranging from about 100 to 200. Still another suitable type of polyepoxide is that derived by similarly condensing epichlorohydrin with an aromatic polyol, specifically bisphenol. Preferred products of this type for the purposes herein exhibit a molecular weight not in excess of about 1,500 and an epoxide equivalent ranging from about 200 to 1,000. While the latter polyepoxides are normally solid materials, they can nevertheless be readily dispersed in an aqueous medium.

As indicated hereinabove, the reaction mixture comprised of the polyaminimide and the polyepoxide is applied to the substrate in the form of an aqueous emulsion of the polyepoxide containing the polyaminimide dissolved therein. In formulating such emulsions, the ratio of the indicated reactants can range from about 90 to 10 parts of the polyaminimide and correspondingly from 10 to 90 parts of the polyepoxide. A preferred range of said reactant mixtures is from about 60 to 40 parts of the polyaminimide and correspondingly from 40 to 60 parts of the polyepoxide. The total solids content of the emulsion is ordinarily adjusted so that from about 0.2 to 5 percent by weight of said solids based on the substrate is deposited in a one-dip application. Other adjuvants such as viscosity control agents, surfactants, latices of elastomers having a high hydroxyl value and the like can be used if desired. Other means of applying the dispersion to the substrate can be observed, but the dipping process has been universally accepted by the tire industry as representing the most convenient manner of application. After treating the substrate in the foregoing manner, it is then heated at a temperature in excess of 150° C. and preferably at least about 200° C. for a time ranging from about 1 –15 minutes.

In the preferred embodiments of this invention, the substrate also bears a coating of a conventional RFL adhesive and as previously mentioned, the latter can be applied after or before treating the substrate with the polyepoxide-polyaminimide reaction product. Normally, a thermosetting-type resorcinol-aldehyde condensate is utilized in an RFL adhesive. The preferred condensates of this type are obtained by condensing resorcinol with formaldehyde or a compound generating formaldehyde in a molar ratio of from about 1:0.9 –1:2, respectively, employing a basic catalyst capable of providing a pH in the range of from about 8 –11. In the practice of the present invention, however, it has been noted that the resorcinol-formaldehyde condensates can acceptably be of the fusible or novolak type. These are conventionally prepared by observing resorcinol-formaldehyde ratio of less than about 1.0, typically in the range of from about 0.5 to 0.7, and carrying out the condensation in the presence of an acid catalyst.

The rubber most satisfactorily adapted for preparing the RFL adhesive composition is a butadiene-styrene-vinyl-pyridine terpolymer of which a number of products of this type are commercially available. Usually, 10 to 20 parts of the phenolic resin and correspondingly from 80 to 90 parts of latex solids are combined in formulating the adhesive. Total solid contents of the RFL composition will depend upon the particular type of material used as the reinforcer, but generally ranges from about 10 to 25 percent.

Although the salient objective herein is to provide improved adhesives for bonding rubber to polyester, the usefulness thereof is obviously not limited to such an application. The novel adhesives of this invention can likewise be advantageously utilized in obtaining reinforced rubber structures wherein the fibrous reinforcer exhibits a similar recalcitrancy toward bonding with rubber as does polyester. Notable examples of such reinforcers are hydrophobic materials such as fiberglass, polyolefin fibers, steel wire cord and the like. Moreover, these adhesives can be used to bond rubber to rayon and nylon to obtain reinforced structures exhibiting strength properties substantially beyond that provided by the conventional RFL adhesives. Also the adhesives of this invention can be employed to bond rubber to plys of dissimilar substrates as in the construction of the belted tires wherein fiberglass fabric belts are laid over conventional plys of polyester, nylon or rayon.

The following examples of specific embodiments are presented to illustrate the best mode contemplated for carrying out this invention. As indicated, these examples are given by way of illustration and, accordingly, any enumeration of detail set forth therein is not to be construed as limiting the invention except as such limitations appear in the appended claims. All parts are parts by weight unless otherwise specified.

EXAMPLE I

This example serves primarily to illustrate the effectiveness of a polyaminimide-polyepoxide adhesive for bonding polyester cord to rubber in a one-dip operation. The polyester cord of this example was a three-ply filament of the type conventionally used in the manufacture of motor vehicle tires. The method of coating consisted of passing the cord through the respective adhesive emulsions employed in this example and thereupon drying at 200° C. for the times indicated in table I under the heading "Thermolysis." The treated cord's adhesion to rubber was determined in accordance with the standard "H" test (ASTM Method No. D2138 –62T). A vulcanizable rubber compound of the following recipe was employed in this test.

| | | Parts |
|---|---|---|
| Natural rubber No. 1 smoked sheet | | 35 |
| cis-1, 4-polybutadiene rubber | | 20.0 |
| SBR rubber | | 67.5 |
| FEF carbon black | | 55.0 |
| Zinc oxide | | 10.0 |
| Stearic acid | | 1.0 |
| Pine tar oil | | 7.5 |
| Antioxidant BLE (Naugatuck Chem. Co.) | | 0.5 |
| Sulfur | | 3.0 |
| Resin (Resorcinol/HCHO–1/ | 0.7 moles, resp. | 0.75 |
| CBS (N-cyclohexyl-2-benzothiazole) | | 0.8 |
| DPG (diphenylguanidine) | | 0.2 |

The formulations of the various dipping solutions of this example and the results obtained in the respective adhesion tests are outlined in the following table I.

TABLE I

| Run No. | Poly-aminimide (PAI) | Dip composition (parts) | | | | | Thermolysis, min. at 200° C. | Ave. "H" value, lbs. |
|---|---|---|---|---|---|---|---|---|
| | | RF[1] | PAI | PE[2] | Poly BD[3] | Water (total) | | |
| 1 (control) | | | | | | | | 1.8 |
| 2 | A | 10 | 4 | 4 | 10 | 72 | 2 | 12.8 |
| 3 | A | | 4 | 4 | 10 | 82 | 2 | 9.0 |
| 4 | A | | 4 | 4 | 10 | 82 | 4 | 13.7 |
| 5 | B | | 4 | 4 | 10 | 82 | 2 | 9.4 |

[1] Resorcinol (1.0 M)/HCHO (0.6 M) acid catalyzed condensate.
[2] Polyepoxide (Epon 812, Shell Chem. Co.).
[3] Hydroxyterminated polybutadiene (Poly BD R-45 M, Sinclair).
A = Trimethylamine trimellitylimide.
B = Trimethylamine terephthalylimide.

EXAMPLE II

This example illustrates the use of polyaminimides in accordance with this invention for a tire cord adhesive application following the procedure conventionally observed in a two-dip operation. The test cord was the same as that employed in example I. Drying of the dipped cord in each instance was effected at 220° C. for 2 minutes. The adhesive values (ASTM D3138 –62T) noted for the various test runs together with compositions of the respective dips are outlined in the following table II.

TABLE II

| Run No. | 1st dip composition ᵃ (polyaminimide-PAI) | 2nd dip composition | | | | Rubber | Ave. "H" value, lbs. |
|---|---|---|---|---|---|---|---|
| | | RF[1] | HCHO | Latex[2] | Water | | |
| 1 | C | 4 | 2 | 16 | 78 | I | 23.8 |
| 2 | C | 2 | 1 | 16 | 81 | I | 23.2 |
| 3 | D | 4 | 2 | 16 | 78 | II | 28.3 |
| 4 | D | 2 | 1 | 8 | 89 | II | 25.3 |
| 5 | E | 2 | 1 | 8 | 89 | II | 30.2 |
| 6 | E | 2 | 1 | 8 | 89 | II | 29.7 |
| 7 | E | 4 | 2 | 16 | 78 | II | 33.6 |
| 8 | F | 4 | 2 | 16 | 78 | I | 22.8 |
| 9 | G | 4 | 2 | 16 | 78 | II | 26.6 |
| 10 | H | 4 | 2 | 16 | 78 | II | 30.9 |

ᵃ 1st dip composition with exception of Run Nos. 5, 9 and 10 wherein no latex was present, is as follows:
  6.2 parts PAI (as indicated).
  1.8 parts Epon 812 (Shell Chem. Co.).
  10.0 parts Poly BD R-45M (Sinclair).
  82.0 parts water.
[1] CR8512 resorcinol/HCHO fusible resin (Ashland Chemical Co.).
[2] Gentac vinyl pyridine latex (The General Tire and Rubber Co.).
C = bis-((1,1-dimethyl-1-(2-hydroxypropyl)amine))terephthalylimide.
D = bis-((1,1-dimethyl-1-(2-hydroxypropyl)amine))dithiodipropionylimide.
E = bis-((1,1-dimethyl-1-(2-hydroxypropyl)amine))suberylimide.
F = 1,4-bis-((1,1-dimethyl-1-(2-hydroxypropyl)amine))cyclohexanoylimide.
G = bis-((1,1-dimethyl-1-(2-hydroxypropyl)amine))adipylimide.
H = bis-((1,1-dimethyl-1-(2-hydroxypropyl)amine))azelaylimide.
I = Rubber compound according to recipe given in Example I.
II = Proprietary tire tread recipe (Uniroyal).

EXAMPLE III

In this example adhesive values were determined for a polyester tire cord treated with selected adhesive systems of example II but wherein the conventional method of first forming a polyurethane coating thereon followed by overcoating with the RFL was reversed. Drying conditions employed in these test runs were the same as in example II. The results noted are tabulated in the following table III.

TABLE III

| Run No. | 1st dip composition (parts) | | | | 2nd dip composition ᵃ * (polyaminimide-PAI) | Rubber | Ave. "H" value, lbs. |
|---|---|---|---|---|---|---|---|
| | RF[1] | HCHO | Latex[2] | Water | | | |
| 1 | 4 | 2 | 16 | 78 | C* | I* | 25.4 |
| 2 | 2 | 1 | 16 | 81 | C* | I | 21.9 |
| 3 | 4 | 2 | 16 | 78 | C* | II* | 22.1 |
| 4 | 2 | 1 | 8 | 89 | D* | II | 10.5 |
| 5 | 2 | 1 | 8 | 89 | E* | II | 12.0 |
| 6 | 4 | 2 | 16 | 78 | F* | I | 22.8 |

[1] CR8512 resorcinol/HCHO fusible resin (Ashland Chem. Co.).
[2] Gentac vinyl pyridine latex (The General Tire and Rubber Co.).
* Cf. Table II supra.

We claim:

1. A rubber-reinforcing element in the form of a filamentary substrate of steel, glass, rayon or a synthetic organic polymer having a coating comprising the in situ reaction product of from 90 to 10 parts by weight of (1) a polyepoxide having an epoxide equivalent weight of from about 100 –1,000 and an average molecular weight not in excess of about 1,500; and correspondingly from about 10 to 90 parts by weight of (2) a compound having the formula:

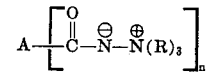

wherein A represents an aromatic, aliphatic or cycloaliphatic residue, R is alkyl or hydroxyalkyl and $n$ is 2 –4.

2. A rubber-reinforcing element in accordance with claim 1 wherein said coating comprises the in situ reaction product of from 60 to 40 parts by weight of said polyepoxide and correspondingly from 40 to 60 parts of said compound.

3. A rubber-reinforcing element in accordance with claim 2 wherein the substrate has from about 0.2 to 5 percent by weight of said coating.

4. A reinforced rubber structure wherein the reinforcing element is a coated substrate in accordance with claim 3.

5. A reinforced rubber structure in accordance with claim 4 wherein said substrate is a polyester cord.

6. A reinforced rubber structure in accordance with claim 5 wherein said polyester cord additionally bears an adhesive coating of a latex and a resorcinol-aldehyde condensate.

7. A reinforced rubber structure in accordance with claim 5 wherein A of the formula of said compound represents a terephthalylene radical.

8. A reinforced rubber structure in accordance with claim 5 wherein A of the formula of said compound represents an adipylene radical.

9. A reinforced rubber structure in accordance with claim 5 wherein A of the formula of said compound represents an azelaylene radical.

10. A reinforced rubber structure in accordance with claim 5 wherein A of the formula of said compound represents a dithiodipropionylene radical.

11. A reinforced rubber structure in accordance with claim 5 wherein A of the formula of said compound represents a suberylene radical.

12. A reinforced rubber structure in accordance with claim 5 wherein A of the formula of said compound represents a cyclohexanoylene radical.

* * * * *